United States Patent
Meguro et al.

[15] 3,692,772
[45] Sept. 19, 1972

[54] PROCESS FOR PREPARING 1,4-BENZODIAZEPIN-2-ONES

[72] Inventors: Kanji Meguro, Nishinomiya; Hiroyuki Tawada, Kyoto; Yutaka Kuwada, Ashiya, Hyogo; Toru Masuda, Nishinomiya, Hyogo, all of Japan

[73] Assignee: Takeda Chemical Industries, Ltd., Osaka, Japan

[22] Filed: Sept. 3, 1969

[21] Appl. No.: 855,042

[30] Foreign Application Priority Data

Sept. 3, 1968 Japan......................43/63323
Sept. 3, 1968 Japan......................43/63324

[52] U.S. Cl....260/239.3 D, 260/239 BD, 260/566 R, 424/244
[51] Int. Cl..............................................C07d 53/06
[58] Field of Search..................260/239.3 D, 239 BD

[56] References Cited

UNITED STATES PATENTS 3,558,603   1/1971   Yamamoto et al..260/239.3 D

*Primary Examiner*—Henry R. Jiles
*Assistant Examiner*—Robert T. Bond
*Attorney*—Wenderoth, Lind & Ponack

[57] ABSTRACT

The process for preparing benzodiazepin-2-one derivatives of the formula

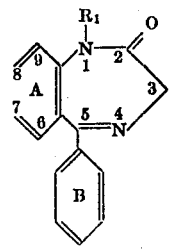

wherein $R_1$ is hydrogen or lower alkyl, and rings A and B are either unsubstituted or substituted by one or more groups of nitro, trifluoromethyl, halogen, alkyl and alkoxy groups, which comprises subjecting a 2-amino-α-phenylbenzylideneaminoacetal derivative to ring-closure, hydrolyzing the resultant product to obtain the 2-hydroxybenzodiazepine derivative, and subjecting such derivative to oxidation to yield the benzodiazepin-2-one derivative. Also provided are novel 1-alkyl-2-hydroxybenzodiazepine derivatives of the formula

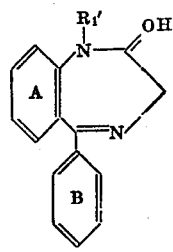

wherein $R'_1$ is lower alkyl and rings A and B may be either unsubstituted or substituted as defined above, such derivatives being useful as intermediates in the above process and also as tranquilizing agents.

2 Claims, No Drawings

PROCESS FOR PREPARING 1,4-BENZODIAZEPIN-2-ONES

This invention relates to a novel and industrially advantageous process for producing benzodiazepin-2-one derivatives of the general formula

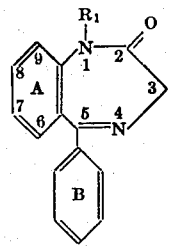

(I)

wherein $R_1$ is hydrogen or lower alkyl, and the respective benzene rings A and B may have one or more substituents selected from the groups consisting of nitro, trifluoromethyl, halogen, alkyl and alkoxy. The present invention also relates to novel 1-alkyl-2-hydroxybenzodiazepine derivatives of the general formula

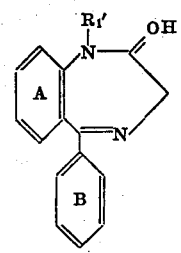

(II)

wherein $R_1'$ is lower alkyl and the respective benzene rings A and B may have the same substituent(s) as defined above, which are useful not only as intermediates for the process of the present invention but also as tranquilizing agents, etc.

The process of the present invention comprises subjecting 2-amino-α-phenylbenzylideneaminoacetal derivatives of the general formula

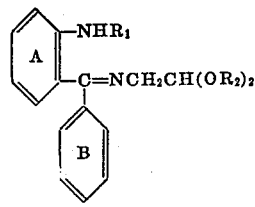

(III)

wherein $R_1$ has the same meaning as defined above and $R_2$ is lower alkyl and the respective benzene rings A and B may have the same substituent(s) as defined above, to a ring-closure reaction, whereby 2-alkyoxybenzodiazepine derivatives of the general formula

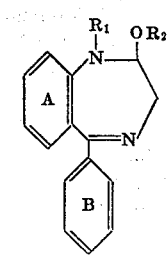

(IV)

wherein $R_1$ and $R_2$ are as defined above, are provided, and subjecting the 2-alkoxybenzodiazepine derivatives (IV) to hydrolysis, whereby 2-hydroxybenzodiazepine derivatives of the general formula

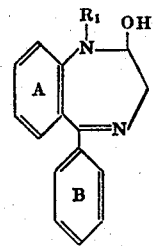

(V)

wherein $R_1$ is as defined above, are provided and finally subjecting the 2-hydroxybenzodiazepine derivatives (V) to oxidation to yield the object benzodiazepin-2-one derivatives (I).

Referring to the above general formulas, the lower alkyl represented by $R_1$ and $R_1'$ is exemplified by methyl, ethyl, propyl, isopropyl, butyl, sec-butyl, tert-butyl, amyl, hexyl, cyclopentyl or cyclohexyl. Among these, methyl and ethyl are the most desirable. The respective benzene rings A and B may have one or more of the same or different substituents which are exemplified by nitro, trifluoromethyl, halogen (chlorine, bromine, fluorine and iodine), alkyl (e.g., lower alkyl such as methyl, ethyl, propyl, isopropyl, butyl and sec-butyl) and alkoxy (e.g., lower alkoxy such as methoxy, ethoxy, propoxy and butoxy) groups. As the lower alkyl represented by $R_2$, those groups having up to six carbon atoms are preferable, which are exemplified by methyl, ethyl, propyl, butyl, pentyl and hexyl groups.

The 2-amino-α-phenylbenzylideneaminoacetal derivatives (III) which are the starting compounds for the process of the present invention can be prepared almost quantitatively, for example, by allowing compounds of the general formula

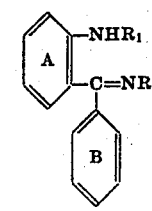

wherein $R_1$ is as defined above and R' is, for example, hydrogen, alkyl or hydroxyalkyl, to react with an aminoacetal of the formula

$$H_2N-CH_2CH(OR_2)_2$$

wherein $R_2$ is as defined above.

According to the first step of the process of the present invention, 2-amino-α-phenylbenzylideneaminoacetal derivatives (III) are subjected to a ring-closure reaction. The ring-closure reaction is preferably carried out in the presence of an acid and a non-aqueous solvent. The acid utilized for the ring-closure reaction may be an inorganic acid (e.g., hydrochloric acid, sulfuric acid, phosphoric acid and polyphosphoric acid) or an organic acid such as a carboxylic acid (e.g., acetic acid, trifluoroacetic acid, propionic acid and butyric acid) or a sulfonic acid (e.g., benzenesulfonic acid and p-toluenesulfonic acid). The amount of acid to be employed is generally about 5 moles to about 10 moles per mole of the 2-amino-α-phenylbenzylideneaminoacetal derivatives (III).

The solvent utilized for the ring-closure reaction is exemplified by alcohols such as methanol and ethanol. The ring-closure reaction is generally carried out with heating around the boiling point of the solvent but the reaction may proceed even at room temperature.

The resultant 2-alkoxybenzodiazepine derivative (IV) is then hydrolyzed. The hydrolysis readily proceeds by treating the 2-alkoxybenzodiazepine derivatives (IV) with water.

Generally, the 2-alkoxybenzodiazepine derivatives (IV) are directly subjected to the hydrolysis without isolation, i.e., by adding water to the reaction mixture of the previous step.

The resultant 2-hydroxybenzodiazepine derivatives (V) may be isolated in the form of acid addition salts (e.g., hydrochloride or sulfate). However, the reaction mixture itself may be directly subjected to the subsequent oxidation step without separation of the compound (V).

According to the final step of the present invention, the 2-hydroxybenzodiaepine derivatives (V) are subjected to oxidation, whereby the hydroxyl group at the 2-position is oxidized to an oxo group.

The oxidation is generally conducted by a per se known method which has been conventionally used for converting a secondary alcohol into the corresponding carbonyl group.

The oxidation is preferably carried out, for example, by the use of an oxidizing agent such as chromium trioxide, dichromate salts, etc. in the presence of a solvent such as glacial acetic acid, aqueous acetic acid, pyridine, aqueous pyridine, etc.

When the oxidation is carried out in an aqueous solvent such as aqueous acetic acid, the 2-alkoxybenzodiazepine derivatives (IV) can be converted directly to the benzodiazepin-2-one derivatives (I) through simultaneous hydrolysis and oxidation.

The oxidation is preferably conducted at room temperature or below.

The oxidizing agent is utilized in an amount of at least one equivalent and preferably in an amount of from about one to about two equivalents for each one equivalent of the 2-hydroxybenzodiazepine derivatives (V).

Thus produced benzodiazepin-2-one derivatives (I) may be isolated in the form of free bases or suitable acid salts (e.g., hydrochloride, sulfate, acetate, etc.) by per se conventional means, for example, by extracting the resulting reaction mixture with a suitable solvent, followed by concentration of the extract.

The 1-alkyl-2-hydroxybenzodiazepine derivatives (II), which are produced as intermediates in the present process, are novel compounds and in themselves show sedative, taming, muscle relaxant and anticonvulsant effects and therefore are useful as tranquillizing, muscle relaxant and anti-convulsant agents, etc.

The novel 1-alkyl-2-hydroxybenzodizaepine derivatives (II) and their acid salts, e.g., the hydrochloride salt, are administered orally or parenterally per se, or in a suitable form such as powder, granule, tablet or injectable solutions admixed with pharmaceutically acceptable carrier or adjuvant. The dosage of the 1-alkyl-2-hydroxybenzodiazepine derivatives (II) or their acid salts to be administered varies with the respective compounds, severity of the disease, etc., and generally falls within a range of from about 1 to about 30 milligrams for oral administration, and from about 0.5 to about 10 milligrams for parenteral administration per day for an adult human.

For a further detailed explanation of the present invention, the following Examples and References are given, wherein the term "part(s)" means "weight part(s)" unless otherwise provided, and the relation between "part(s)" and "part(s) by volume" corresponds to that between gram(s) and milliliter(s).

References for the preparation of 2-amino-α-phenylbenzylideneaminoacetal derivatives, the starting material for the process of the present invention, are as follows:

REFERENCE 1

A solution of 11 parts of 2-amino-5-chloro-α-phenylbenzylideneaminoethanol, 16 parts of aminoacetaldehyde diethylacetal and 9.4 parts of 2-methylimidazole hydrochloride in 200 parts by volume of ethanol is refluxed for 4 hours, followed by distillation of the solvent. Water is added to the residue and the precipitated crystals are recrystallized from aqueous ethanol to give 2-amino-5-chloro-α-phenylbenzylideneaminoacetaldehyde diethylacetal as colorless pillars.

Melting point: 103° to 104° C.

Elementary analysis;

Calculated for $C_{19}H_{23}ClN_2O_2$ C 65.79, H 6.68, N 8.08

Found C 65.65, H 6.68, N 8.15

REFERENCE 2

A solution of 11 parts of 2-amino-5-nitro-α-phenylbenzylideneaminoethanol, 16 parts of aminoacetaldehyde diethylacetal and 9.4 parts of 2-methylimidazole hydrochloride in 200 parts by volume of ethanol is refluxed for 3 hours, followed by distillation of the solvent under reduced pressure. The residue is washed with ethanol to yield 2-amino-5-nitro-α-phenylbenzylideneaminoacetaldehyde diethylacetal as yellow crystals. Melting point: 157° to 161° C. Recrystallization from ethanol affords yellow prisms melting at 161° to 164° C.

Elementary analysis:

Calculated for $C_{19}H_{23}N_3O_4$ C 63.85, H 6.48, N 11.76

Found C 63.77, H 6.44, N 11.62

REFERENCE 3

A solution of 5.6 parts of 2-methylamino-5chloro-α-phenylbenzylideneaminoethanol, 7.8 parts of aminoacetaldehyde diethylacetal and 4.8 parts of 2-methylimidazole hydrochloride in 100 parts by volume of ethanol is refluxed for 4 hours, followed by distillation of the solvent. The oily residue is extracted with ethyl acetate, washed with water and dried over sodium sulfate, followed by distillation of the solvent, whereby 2-methylamino-5-chloro-α-phenylbenzylideneaminoacetaldehyde diethylacetal is produced as yellow crystals.

For identification, a small amount of the crystals is recrystallized from ethanol to give pale yellow needles melting at 62° to 63.5° C.

Elementary analysis:
Calculated for $C_{20}H_{25}ClN_2O_2$ C 66.56, H 6.98, N 7.76
Found C 66.55, H 6.93, N 7.74

EXAMPLE 1

A solution of 1 part of 2-amino-5-chloro-α-phenyl-benzylideneaminoacetaldehyde diethylacetal in 20 parts by volume of ethanol containing 10 percent hydrogen chloride is heated at 50° C. for 10 minutes, followed by concentration of the solution below 40° C. under reduced pressure. The reddish residue is dissolved in a mixture of 10 parts by volume of acetone and 2 parts of volume of water. The solution is left standing for a while, whereby 7-chloro-2hydroxy-5-phenyl-2,3-dihydro-1H-1,4-benzodiazepine hydrochloride is obtained as yellow crystals.
Melting point: 125° C. (decomposition).

Elementary analysis:
Calculated for $C_{15}H_{13}ClN_2O \cdot HCl \cdot H_2O$ C 55.06, H 4.93, N 8.56
Found C 55.10, H 4.65, N 8.95

EXAMPLE 2

A solution of 1.2 parts of 7-chloro-2-hydroxy-5-phenyl-2,3-dihydro-1H-1,4-benzodiazepine hydrochloride prepared in the Example 1 in 6 parts by volume of pyridine is added dropwise with stirring and ice-cooling to a mixture of 0.8 part of chromium trioxide and 5 parts by volume of pyridine. The mixture is left standing at room temperature for 2 hours. Water is added and the mixture is extracted with ethyl acetate. The ethyl acetate layer is washed with water and concentrated under reduced pressure. The residue is recrystallized from acetone to give 7-chloro-5-phenyl-1,3-dihydro-2H-1,4-benzodiazepin-2-one as pale yellow crystals.
Melting point: 212° to 213° C.

EXAMPLE 3

A solution of 3.6 parts of 2-amino-5-nitro-α-phenyl-benzylideneaminoacetaldehyde diethylacetal in 40 parts by volume of ethanol containing 10 percent hydrogen chloride is refluxed for 10 minutes, followed by distillation of the solvent below 50° C. under reduced pressure. To the reddish residue is added 15 parts by volume of water and the mixture is left standing for awhile, whereby 2-hydroxy-7-nitro-5-phenyl-2,3-dihydro-1H-1,4-benzodiazepine hydrochloride is yielded as yellow crystals.
Melting point: 178° C. (decomposition).

Elementary analysis:
Calculated for $C_{15}H_{13}N_3O_3 \cdot HCl \cdot 1/2H_2O$ C 54.80, H 4.60, N 12.78
Found C 54.90, H 4.77, N 12.67

EXAMPLE 4

A solution of 1.28 parts of 2-hydroxy-7-nitro-5-phenyl-2,3-dihydro-1H-1,4-benzodiazepine hydrochloride prepared in the Example 3 in 8 parts by volume of pyridine is added dropwise with stirring and ice-cooling to a mixture of 0.8 part of chromium trioxide in 15 parts by volume of pyridine.

The mixture is left standing at room temperature for 2 hours and poured into water, followed by extraction with ethyl acetate. The ethyl acetate layer is washed with water and dried over sodium sulfate, followed by distillation of the solvent. The residue is crystallized from ethanol to yield 7-nitro-5-phenyl-1,3-dihydro-2H-1,4-benzodiazepin-2-one as pale yellow plates.
Melting point: 223° to 224° C.

EXAMPLE 5

To a mixture of 3.2 parts of 2-hydroxy-7-nitro-5-phenyl-2,3-dihydro-1H-1,4-benzodiazepine hydrochloride and 50 parts by volume of glacial acetic acid is added dropwise with stirring a mixture of 1.5 parts of chromium trioxide, 30 parts by volume of glacial acetic acid and a small portion of water. The mixture is left standing for 2 hours. The solution is poured into water and neutralized with sodium bicarbonate, followed by extraction with ethyl acetate. The ethyl acetate layer is washed with water and dried over sodium sulfate, followed by distillation of the solvent. The residue is recrystallized from ethanol to yield 7-nitro-5-phenyl-1,3-dihydro-2H-1,4-benzodiazepin-2-one as yellow crystals.
Melting point: 220° to 222.5° C.

EXAMPLE 6

A solution of 3.6 parts of 5-chloro-2-methylamino-α-phenylbenzylideneaminoacetaldehyde diethylacetal in 30 parts by volume of ethanol containing 10 percent hydrogen chloride is left standing at room temperature overnight, followed by concentration to dryness at room temperature under reduced pressure. The yellow residue is dissolved in 50 parts by volume of glacial acetic acid and to the solution is gradually added a mixture of 3 parts of chromium trioxide, 10 parts by volume of glacial acetic acid and a small portion of water. The whole mixture is left standing for 1 hour, followed by addition of water. The mixture is extracted with ethyl acetate. The ethyl acetate layer is washed with water, dried over sodium sulfate, followed by distillation of the solvent. The residue is recrystallized from an acetone-petroleum ether mixture to give 7-chloro-1-methyl-5-phenyl-1,3-dihydro-2H-1,4-benzodiazepin-2-one as colorless crystals.
Melting point: 130° to 132° C.

EXAMPLE 7

A solution of 3.6 parts of 5-chloro-2-methylamino-α-phenylbenzylideneaminoacetaldehyde diethylacetal in 30 parts by volume of ethanol containing 10 percent hydrogen chloride is left standing at room temperature for 20 hours, followed by distillation of the solvent below 25° C. under reduced pressure. The precipitated crystals are treated with a small amount of aqueous acetone to yield 7-chloro-2-hydroxy-1-methyl-5-phenyl-2,3-dihydro-1H-1,4-benzodiazepine hydrochloride as yellow crystals.
Melting point: 108° to 110° C. (decomposition).

Elementary analysis:
Calculated for $C_{16}H_{15}ClN_2O \cdot HCl \cdot 2/3H_2O$ C 57.32, H 5.21, N 8.36
Found C 57.24, H 5.19, N 8.00

What is claim is:
1. A process for producing a compound of the formula

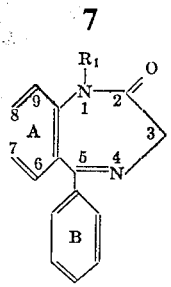

wherein $R_1$ is hydrogen or lower alkyl and the rings A and B are unsubstituted or substituted by at least one of the substituents selected from the group consisting of nitro, trifluoromethyl, halogen, lower alkyl and lower alkoxy groups, which comprises contacting a compound of the formula

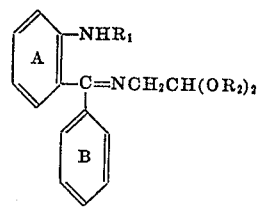

wherein $R_1$ is as defined above, $R_2$ is lower alkyl and the rings A and B are unsubstituted or substituted as defined above, with an acid in the presence of a non-aqueous solvent at a temperature from room temperature to the boiling point of the solvent to effect ring-closure, hydrolyzing the resultant product with water to prepare a compound of the formula

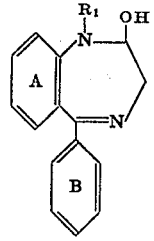

wherein $R_1$ is as defined above and the rings A and B are unsubstituted or substituted as defined above and oxidizing the resultant hydrolysate with chromium trioxide or dichromate salt.

2. The process as claimed in claim 1, wherein the oxidation is carried out by means of chromium trioxide as an oxidizing agent.

* * * * *